Figure 3:
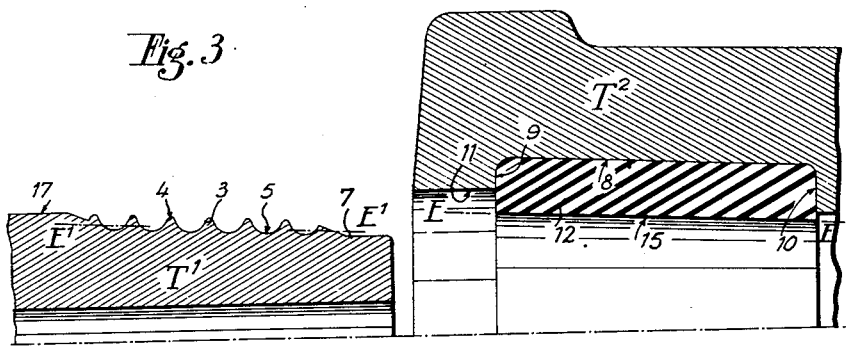

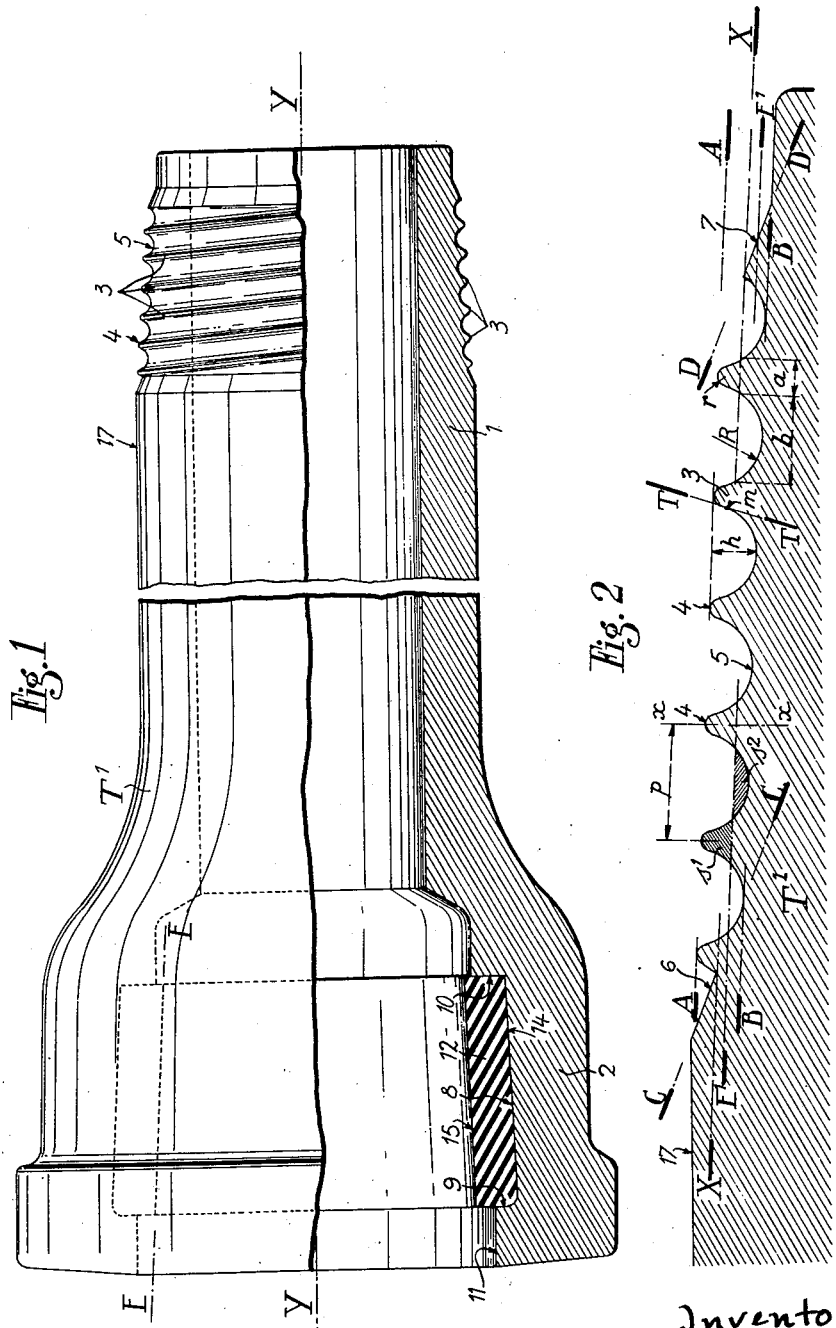

May 28, 1957  C. JUNGBLUT  2,793,884
JOINT BETWEEN SCREW THREADED AND ELASTIC LINED PIPE ENDS
Filed March 1, 1954  2 Sheets-Sheet 2

Inventor:
Charles Jungblut
by J. Delattre-Seguy
Attorney

United States Patent Office 2,793,884
Patented May 28, 1957

2,793,884

JOINT BETWEEN SCREW THREADED AND ELASTIC LINED PIPE ENDS

Charles Jungblut, Pont-a-Mousson, France, assignor to Compagnie de Pont-a-Mousson, Nancy, France, a French body corporate Application March 1, 1954, Serial No. 413,335

Claims priority, application France March 5, 1953

1 Claim. (Cl. 285—231)

The present invention relates to pipe elements for conducting fluid under pressure and fluid-tight joints or connections between these elements, these connections being of the type in which the screw-threaded end or male portion of a pipe is screwed in a sleeve of rubber or like elastic or yieldable material which is housed in the socket of the adjoining pipe.

Various screw threads are known having threads with rounded crests and roots, but having a symmetrical profile in that the profile of the thread crest is exactly superposable on that of the thread root. This is particularly so in the case of gas fixture threads.

There are also known screw threads having a dissymmetrical profile such as wood screw threads. However, the threads of these screws are fairly thin and their edges are sharp. These threads, which penetrate the wood by cutting the latter, would behave in the same manner in the sleeve of the pipe connection if they were used for pipe connections. They are therefore unsuitable for such use owing to the deterioration of the sleeve.

The invention has for object to provide a pipe element (pipe or connection) having preferably a relatively small diameter (100 mm. and less) and provided with at least one male end which is screw threaded for purposes of its connection with another element with the interposition of a sleeve of an elastic material such as rubber, this pipe element being characterized in that the profile of the screw thread of its male end is dissymmetrical, the width of the thread at a level midway between the crest and the root thereof being less than the corresponding width of the groove formed between two adjoining thread turns, the profile of the thread being a continuous curve which has a progressive variation in its slope and includes two radiused portions of opposite curvature connected along a common tangent, the radius of curvature corresponding to the crest of the thread being smaller than that corresponding to the root of the thread.

The invention has for further object to provide the assembly or connection of the male end of this pipe element with the socket of another pipe element, this assembly being of the type including a sleeve of an elastic material interposed between the socket and male end, this connection being characterized in that the volume of the sleeve is substantially equal to the volume of the annular space existing between the screw thread surface of the male end and the inner wall of the socket whereby this sleeve wholly fits round the screw thread surface simply by becoming deformed.

Figure 4:
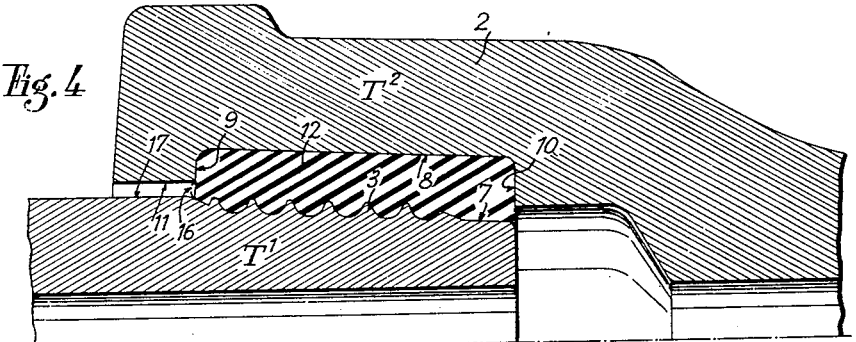
Figure 5:
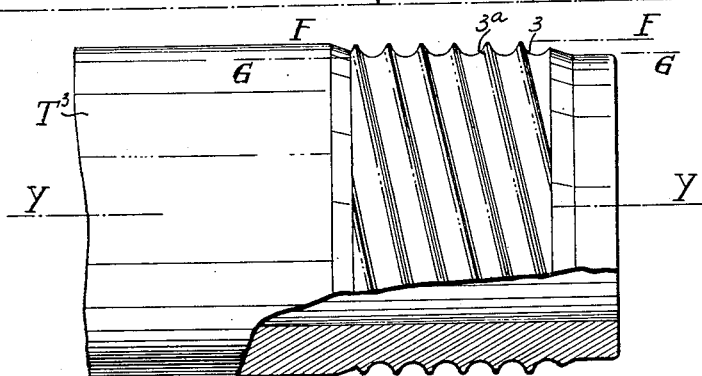
Figure 6:
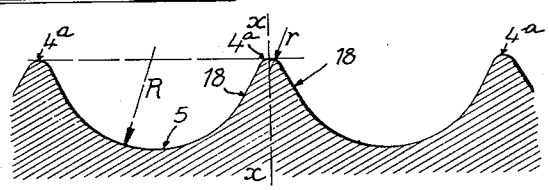

Other features and advantages of the invention will appear from the ensuing description with reference to the accompanying drawings given merely by way of example and in which:

Fig. 1 is a half-elevational view and a longitudinal half-sectional view of a pipe improved in accordance with the invention, Fig. 2 is a longitudinal sectional view of the screw thread of the male end on a scale larger than that of Fig. 1, Fig. 3 is a longitudinal radial sectional view showing, before assembly, the male end of a pipe and the socket of another pipe in which the sleeve of rubber is already disposed, Fig. 4 is an analogous view of the assembly, Fig. 5 is an elevational and partly sectional view of a modification of the screw thread according to the invention, and Fig. 6 is a longitudinal sectional view of another modification of the screw thread according to the invention.

According to the embodiment shown in Figs. 1 and 2, the pipe $T^1$ is shown to be of the type including at one of its ends a screw-threaded male end 1 and at its other end a socket 2. The screw thread of the male end 1 comprises a helical thread 3 having a dissymmetrical profile. In a transverse section of the thread, its crest 4 is rounded and its radius of curvature $r$ is small but constant; this portion of the thread is connected to that of the thread root 5 which is also rounded and has a constant radius of curvature R.

If it is assumed that XX is the line passing midway between the crest and root of the threads and $a$ represents the width along XX of the thread and $b$ the width of the groove of the thread along XX, R and $r$ are so selected that the width $a$ is less than the width $b$ and, furthermore, that the crest 4 is directly connected to the root 5 at a point of inflection $m$ along a common tangent TT.

The ratio $a/b<1$ may advantageously be of the order of ⅓ or even less. This ratio is determined by the required strength of these threads which must withstand not only stresses due to the screwing operation but above all shearing stresses caused by the pressure which prevails inside the pipe and is exerted in the longitudinal direction on the ends of the pipes or on bottoms of the sockets and by the penetration of the screw threads in the elastic sleeve.

The height of the threads $h$ is such that if $p$ is the screw thread pitch, $p$ is at least equal to $2h$.

According to conventional methods, the screw thread 3 of the presently described example is conical or tapered in that its crests 4 and roots 5 are tangent to two parallel conical surfaces which are coaxial with the axis YY of the pipe and have generatrices AA and BB (Fig. 2). The angle at the apex of these conical surfaces may be advantageously of the order of 6°.

The axis $xx$ (Fig. 2) of the transverse section of the thread through a plane containing the longitudinal axis of the pipe is in the present example always perpendicular to the generatrices AA and BB.

Further, in the known manner, the screw thread provided on the pipe has a washout thread portion at 6 where a conical surface CC having an included apex angle of the order of 45° renders the thread only partially formed and thus renders the pipe stronger at this point. Further, there is provided at 7 at the end of the pipe another bevel or conical surface DD whose included apex angle may be of the order of 45°. This beveled end facilitates the entry of the screw thread in the sleeve of the adjoining pipe, as will be described hereinunder.

At the other end of the pipe $T^1$ the socket 2 comprises an annular recess whose longitudinally extending wall 8 is conical or tapered and is defined by two shoulders 9 and 10 which are provided at the entrance and at the bottom or inner end respectively of the socket. The entrance 11 has a diameter greater than the outside diameter of the cylindrical pipe.

The pipe $T^1$ is completed by a sleeve 12 of rubber or other similar elastic material, the latter being, if desired, of such nature as to be resistant to the action of the fluid to be conducted by the pipe. If it concerns in particular a pipe for heating gas or for hydrocarbons, the sleeve may be of synthetic rubber having a hardness of around 70 to 80° Shore. Preferably, this sleeve is relatively thin, this aids its introduction in the end of the pipe by merely temporarily folding it along a longitudinally extending fold and inserting it in the end of the socket 2. The dimensions and shape of this sleeve are such that its outer face 14 exactly corresponds to the shape of the wall 8 of the recess in the socket 2, and its inner surface 15 is conical and parallel to the conical surfaces AA and BB of the screw thread. Further, the basic diameters of this inner surface 15 are such that, firstly, this surface, when superposed on the screw thread would have its conical surface shown by EE in Fig. 1, disposed at $E^1E^1$ and parallel to the surfaces AA and BB (Fig. 2) and, secondly, the areas $s^1$ and $s^2$ are substantially equal. The areas $s^1$ and $s^2$ correspond, respectively, to the portion of the section of the thread situated outside the straight line $E^1E^1$ and to the portion of the section of the groove between the adjoining thread turns situated on the other side of this straight line. However, the area $s^1$ may exceed the area $s^2$ by 1–5%.

Referring now to Figs. 3 and 4, which illustrate the assembly of two pipes $T^1$ and $T^2$ of the above-described type, the screw-threaded male end of the pipe $T^1$ and the socket 2 of the pipe $T^2$ are shown. This socket is identical to that described above for the pipe $T^1$. It will be of course understood that the pipes $T^1$ and $T^2$ are identical only insofar as concerns the dimensions of their ends and the actual pipe diameters, these pipes being of any length.

In order to assemble the two pipes $T^1$ and $T^2$, the male end of the pipe $T^1$ is introduced in the entrance 11 of the pipe 2. The conical end 7 of the male end penetrates the sleeve 12. As soon as the screw thread engages the entrance end of the sleeve there is imparted manually and without difficulty a rotational movement to the pipe $T^1$, while the pipe $T^2$ is held stationary or is rotated in the opposite direction. In this way the screw thread 3 of the pipe $T^1$ is gradually screwed into the sleeve 12 of the pipe $T^2$.

The rubber of the sleeve is progressively deformed by the penetration of the screw thread and exactly fills the grooves or roots of this thread, provided the dimensions of the sleeve in its free state are such that the areas of the sections $s^1$ and $s^2$ (Fig. 2) are equal, as explained above. Finally, at the end of the screwing operation the pipe assembly is as shown in Fig. 4, the sleeve being in intimate contact with the wall 8 of the socket and with the whole of the surface of the screw thread 3.

If the area $s^1$ is, on the other hand, greater than the area $s^2$ by several percent, when the male end is screwed into the sleeve 12 it increases the deformation of the rubber and this results in a slight longitudinal elastic flow of this rubber and a slight bulge, as shown at 16 in Fig. 4, is formed at the outer end of the sleeve in the annular space existing between the entrance 11 of the pipe $T^2$ and the outer cylindrical wall 17 of the pipe $T^1$.

Experiments have shown that in both cases the pipes are connected together in a strictly fluid-tight manner and they remain thus even with very high pressures prevailing in the piping.

Example of a tested pipe connection:

| | |
|---|---|
| Outside diameter of the cylindrical part 17 of the pipe $T^1$ | 40 mm. |
| Ratio $h/p$ between the height $h$ and the pitch $p$ of the screw thread | 1/2.5. |
| Ratio $a/b$ | 1/2.5. |
| $r$ | 0.1 mm. |
| $R$ | 1 mm. |
| Number of non-truncated thread turns | 5. |
| Total number of thread turns, including the truncated threads | 7. |
| Angle at the apex of the conical surfaces parallel to XX | 6°. |
| Hardness of the rubber used | 80° Shore. |
| Position of the generatrix $E^1E^1$ which corresponds to the inner face of the sleeve in its free state | At a level $1/3h$ from the base of the screw thread. |
| Radial thickness of the sleeve in the free state | 4 mm. |
| Axial length of the sleeve in its free state | 38 mm. |

This pipe connection withstood an internal pressure of 150 kg./cm.² before the connection failed. The ends of the pipes $T^1$ and $T^2$ were not butted together and were free to separate from each other in the axial direction. This result was possible owing to the fact that the screw thread according to the invention allowed a very good penetration of the crests of the screw thread in the rubber. Furthermore, on account of the relatively small curvature of the roots 5 of the screw thread and of the continuity of this curvature devoid of the singular points which would exist if there were sudden changes in the curvature, the rubber, which was compressed by the penetration of the thread, entered exactly into contact with the latter along the entire surface of the thread roots and thus prevented any leakage.

This advantage is of particular interest when synthetic rubber sleeves are used which have a hardness of the order of 70–80° Shore and whose elastic deformability is relatively low. Owing to the screw thread according to the invention the screwing effort required for obtaining a given deformation remains within acceptable limits.

In the example shown in Figs. 1–4 the screw thread of the male end has only one thread, that is there is only one helical groove or root to be filled per rotation of the pipe. However, a screw thread having more than one thread may be provided, that is a multi-start thread. Furthermore, the screw thread instead of being conical or tapered may be cylindrical or parallel.

Fig. 5 shows such an embodiment having two threads 3 and $3^a$ the pitch of which is of course greater than the pitch $p$ of the single thread of the first example. The thread is comprised between two cylindrical surfaces FF and GG which are parallel to the axis YY of the pipe $T^3$.

Whether the screw thread be tapered or parallel, the radius of curvature $r$ of the crest of the threads may be less than the value necessary for realising the direct connection of the curved part of the section of this crest to the curved section of radius R of the root of the thread. This has been shown in Fig. 6, where the curved portions $4a$ and 5, having radii $r$ and $R$ respectively, are connected by straight portions 18. In the case of a tapered screw thread, whether the section of the thread(s) includes or does not include straight portions, the axis $xx$ (Figs. 2 and 6) of the profile of the thread may be perpendicular either to the longitudinal axis of the pipe or to the parallel conical surfaces defining this screw thread.

Although there has been shown in Fig. 1 a pipe $T^1$ having a male and female end it is obvious that the invention is applicable also to pipes or pipe elements which comprise a screw thread at both ends.

Although specific embodiments of the invention have been described hereinbefore, it should be understood that many changes and modifications may be made therein without departing from the spirit of the invention or the scope of the appended claim.

Having now described my invention what I claim as new and desire to secure by Letters Patent is:

Pipe joint comprising in combination: a screw-threaded male end of a first pipe element, the profile of the screw-threads of said male end being dissymmetrical the height of the threads of said screw-thread being at the most as great as the half of the pitch of said threads, the profile of said screw-thread being a curve comprising a crest portion and a root portion, said portions having radii of curvature of opposite directions, said portions being directly joined by a point of inflection of curvature and having a common tangent, the radius of curvature corresponding to the crest portion being equal to about one-tenth of the radius of the root portion; a socket of a second pipe element, said socket having a longitudinal axis; an annular groove in said socket, said groove having a longitudinal bottom surface of revolution around said axis and two transverse end faces substantially perpendicular to said axis, said male end engaging said groove; a sleeve of an elastic material having a hardness of about 80° Shore and inserted between said socket and said male end; said sleeve filling integrally said groove; said male end being screwed in said sleeve without any clearance between said screw-thread and said sleeve; the volume of said sleeve in its free state being greater by no more than 5 percent of the volume of the annular space provided between the surface of the threads of the male end, the bottom surface and the transverse end faces of said annular groove; said sleeve, in its free state, having an external surface corresponding to the bottom surface of said groove and an inner surface which, when assumed to coincide with the threads of said male end, defines axial radial sections of the crest and of the adjoining groove having substantially equal areas, the area of the section of the crest being at least equal to the area of the section of the groove.

References Cited in the file of this patent

UNITED STATES PATENTS

| | | |
|---|---|---|
| 566,136 | Caldwell | Aug. 18, 1896 |
| 1,844,409 | Rypinski | Feb. 9, 1932 |
| 2,860,522 | Arnold | May 31, 1932 |
| 2,052,019 | Baker | Aug. 25, 1936 |
| 2,512,082 | Bainbridge | June 30, 1950 |
| 2,681,815 | McCarn | June 22, 1954 |

FOREIGN PATENTS

| | | |
|---|---|---|
| 22,512 | Great Britain | Oct. 1, 1897 |
| 679,581 | Great Britain | Sept. 17, 1952 |